(12) United States Patent
Duwe et al.

(10) Patent No.: US 6,261,032 B1
(45) Date of Patent: *Jul. 17, 2001

(54) CUTTING TOOL WITH CLAMPING DEVICE

(75) Inventors: Jurgen Duwe, Heiterwang; Rudolf Stricker, Lermoss, both of (AT)

(73) Assignee: Schwarzkopf Technologies Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,929

(22) Filed: Apr. 8, 1997

(30) Foreign Application Priority Data

Apr. 18, 1996 (AT) .................................................. 216/96 U

(51) Int. Cl.$^7$ ............................. B23B 29/00; B23B 29/14
(52) U.S. Cl. ........................... 407/110; 407/107; 407/117
(58) Field of Search ..................................... 407/110, 111, 407/112, 113, 103, 102, 101, 9, 10, 117, 107

(56) References Cited

U.S. PATENT DOCUMENTS

| | | | |
|---|---|---|---|
| 1,793,564 | * | 2/1931 | Severson ........................... 407/112 X |
| 2,930,111 | * | 3/1960 | Clair .................................... 407/10 |
| 3,205,557 | * | 9/1965 | Frommelt et al. ............... 407/111 X |
| 5,076,738 | * | 12/1991 | Pano et al. ........................ 407/102 X |
| 5,682,803 | * | 11/1997 | Boianjiu ............................ 407/102 X |

FOREIGN PATENT DOCUMENTS

| | | | |
|---|---|---|---|
| 213925 | * | 12/1957 | (AU) ..................................... 407/103 |
| 1037807 | * | 8/1958 | (DE) ..................................... 407/107 |
| 1084106 | * | 6/1960 | (DE) ..................................... 407/107 |
| 21 10 078 A | | 9/1971 | (DE) . |
| 26 53 222 | | 6/1977 | (DE) . |
| 36 17 119 A1 | | 11/1987 | (DE) . |
| 92 01 113 | | 4/1993 | (DE) . |
| 568 513 A1 | | 11/1993 | (EP) . |
| 764093 | * | 5/1934 | (FR) ....................................... 407/10 |
| WO 95/29781 A1 | | 11/1995 | (WO) . |

OTHER PUBLICATIONS

Copy of Austrian Search Report for Austrian priority application GM 216/96.

* cited by examiner

Primary Examiner—Henry Tsai
(74) Attorney, Agent, or Firm—Morgan & Finnegan, LLP

(57) ABSTRACT

The invention describes a cutting tool, preferably a cutoff parting tool, having one or more replaceable cutting inserts. The cutting inserts comprises on the supporting and/or clamping surfaces embossed elements. Upon clamping the cutting inserts these elements cause a plastic deformation of the contact surfaces on the toolholder. In this fashion, the cutting inserts are additionally stabilized against lateral compressive forces and tensile forces forcing them out of the seat.

8 Claims, 2 Drawing Sheets

CUTTING TOOL WITH CLAMPING DEVICE

BACKGROUND OF THE INVENTION

1. Field of the Invention

The invention relates to a cutting tool and, more particularly, to a cutting tool having one or more replaceable cutting inserts which can be clamped to the toolholder and which feature, on the supporting and/or clamping surfaces, elements for achieving a formfitting, correctly located positioning.

2. Description of the Related Art

In cutting tools having replaceable cutting inserts, the cutting inserts are fixed to the toolholder using a wide variety of clamping elements. One widely used clamping method consists of providing the cutting inserts with a central hole, which are fixed to the toolholder by means of screws with appropriate head shapes or with clamping elements that engage directly on the wall of the central hole, such as eccentrics or tilting pins. Other known clamping elements are, for instance, clamping claws that engage the cover surface of the indexable, replaceable insert, causing the cutting insert to be attached to the toolholder.

In the case of cutting inserts for cutoff or parting, which as a rule are extended in length, it is customary to improve clamping by providing the cutting inserts with a concave or convex V-shaped supporting and/or clamping surface and to subject the clamping surface to the necessary clamping force via a threadable clamping claw or by means of elastic segments of the toolholder and/or the seating blade through the elastic deformation of these segments.

Inasmuch as on modern machine tools the cutoff inserts are often used not only for parting or recessing, but also for producing surface contouring by turning or facing, it is unavoidable that such cutting inserts are also stressed by lateral compressive or tensile forces. For such cutting operations, the clamping force exerted upon the cutting insert is often insufficient so that, despite these V-shaped supporting and/or clamping surfaces, there may result a shifting or even a pullout of the cutting insert from the toolholder. This results in dimensional deviation of the work piece in process, reduced working life because of premature wear, breakage or loss of the cutting insert, as well as damage to the tool bit seat or the clamping parts on the toolholder.

Such deficiencies involving an occasionally inadequate attachment of the cutting insert to the toolholder led to the introduction-over and above the customary clamping elements—of mutually coordinated elevations and recesses in the contact surfaces between the cutting insert and the toolholder. This was done to provide an additional positive form fit between the cutting insert and the toolholder and thus leads to improved positioning possibilities and to an improved clamping of the cutting inserts in the toolholder. Examples of such designs of cutting inserts and toolholders are described in DE-OS 36 17 119, DE-OS 26 53 222 and DE-GM 92 01 113.

A disadvantage of such known tool bit attachments is the fact that the production of such additional formfitting registering elements is expensive; they must be provided both on the tool bits and on the toolholders and must be precisely adjusted to one another, in order to ensure that the tolerances required for the cutting tool with respect to the position of the cutting edge are maintained.

SUMMARY OF THE INVENTION

Consequently, one of the objects of the present invention is to provide a cutting tool having one or more replaceable cutting inserts that can be clamped to the toolholder, the cutting inserts including elements for providing formfitting, correctly located positioning on the supporting and/or clamping surfaces of the toolholder, which will avoid the above-mentioned deficiencies.

This and other objects are achieved by the present invention in that the elements are designed to be embossed in such a manner that one achieves a plastic deformation by means of the surface pressure exerted by the respective clamping installation upon the corresponding contact surfaces on the toolholder when fastening the cutting inserts.

In this fashion, a novel advantage of the present invention is that the material from which the cutting inserts are made features a greater hardness than the material of the toolholder.

By the design of the elements in accordance with the present invention (which, compared to the previously known elements are substantially smaller in dimensions), it is now only necessary to provide the cutting insert with embossed elements, which can be achieved in a simple manner by appropriately shaped pressing tools. The previously required expensive, precise coordination of the respective recesses in the toolholder may be eliminated completely since the latter are achieved in a simple manner, automatically and correctly located, by means of plastic deformation when the cutting insert is clamped fast to the toolholder. It was not expected that upon using even small-size embossed elements alone, an excellent formfitting attachment of the cutting insert to the toolholder would be attained to such an extent. In addition, such an attachment brings with it a clear-cut improvement of the positioning and fastening of the cutting insert with respect to lateral compressive and tensile forces. The precise form and dimensioning of the elevations should be adjusted in accordance with the differences in the hardness of the materials used for the cutting insert and for the toolholder, the size of the cutting insert and the magnitude of the clamping force. To those who are of ordinary skill in the art, these adjustments are merely routine steps of the art.

The invention can be used not only on cutting tools with cutting inserts made of cemented carbide or other superhard material and to steel as the material for the toolholder, but also to cutting inserts which, like the toolholder, are made of steel. The only important factor is that the difference in hardness between the cutting insert and the toolholder be sufficiently great to permit a plastic deformation of the toolholder. The practice has shown that hardness differences of at least about 20 HRC are required. It is furthermore practical to make the elements as sharp-edged as possible. With respect to their dimensions, practice has shown that, when cemented carbide is used for the cutting insert, it is advantageous to provide a projection in the range between 0.08 mm and 0.1 mm for the supporting and/or clamping surface.

A particularly advantageous form of the elements proved to be sharp-edged roof-shaped elevations with an acute angle between 80° and 90°. It is particularly advantageous to apply the invention to cutting inserts for cutoff parting, with a V-shaped supporting and/or clamping surface. Cutting inserts designed in this fashion then lend themselves in an excellent manner for contour- and form-turning, without leading to a shifting or pull-out of the cutting insert from the toolholder.

In this connection, it proved particularly advantageous to design the supporting and/or clamping surface of the cutting inserts with a multiplicity of roof-shaped elevations, arranged parallel to one another and perpendicular to the longitudinal axis of the cutting insert.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

Figure 1:
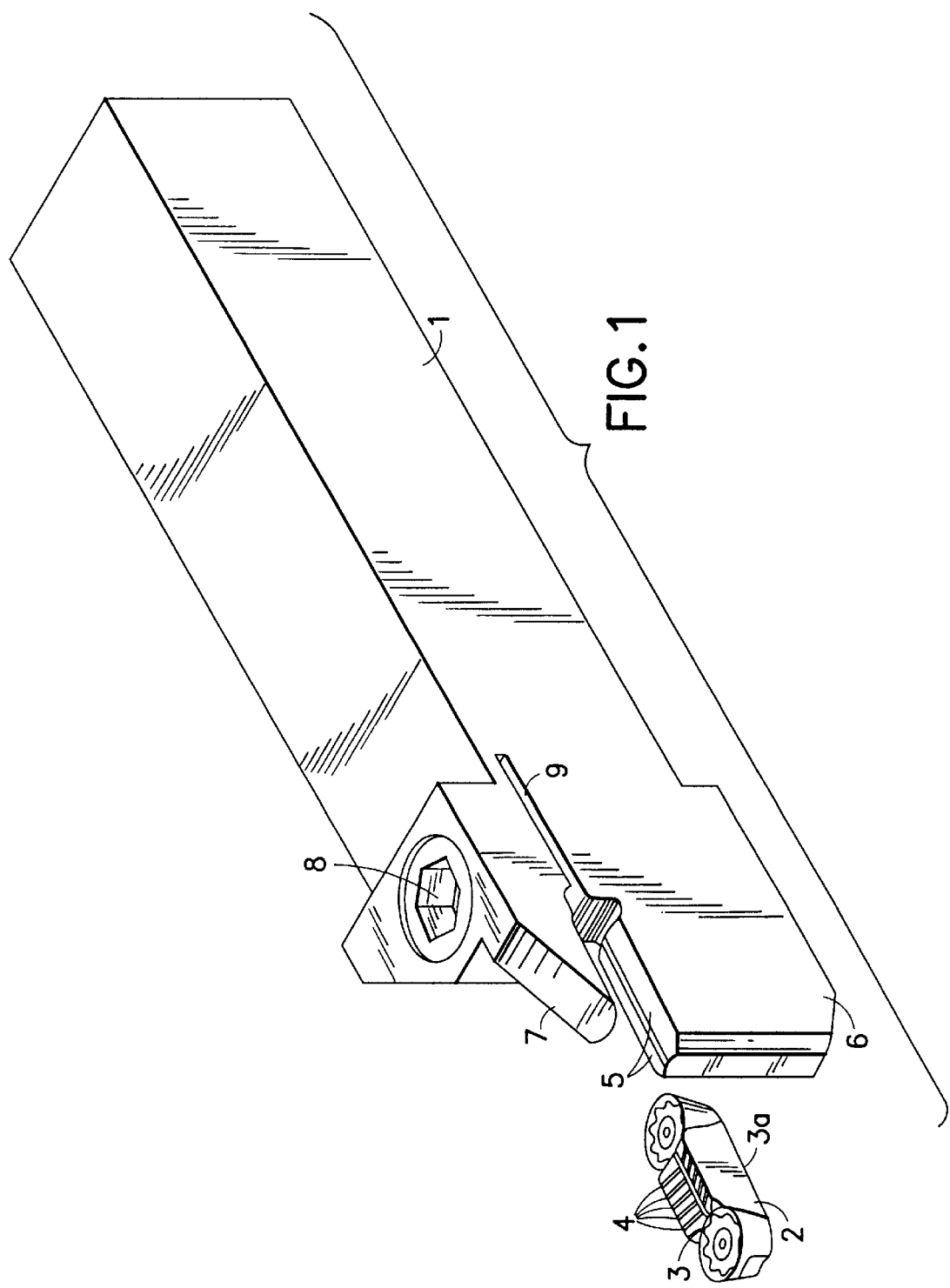
FIG. 1 is a perspective view of a cutting tool according to the present invention in the form of a cutoff parting tool.

FIG. 1 illustrates a cutoff tool according to the present invention. The cutoff tool comprises a toolholder 1 having an indexable, replaceable cutting insert 2 made of cemented carbide. The blade-shaped front section of the toolholder 1 includes a recess to accommodate the cutting insert 2, which recess changes at the end into a slit 9. In this fashion, a rigid supporting segment 6 and an elastic clamping claw 7 are formed, each of which include convex, V-shaped contact surfaces 5 to accommodate the cutting insert. The surface of these contact surfaces 5 is smooth and made without recesses. As can also be seen in FIGS. 2–4, the cutting insert 2 comprises appropriately formed concave, V-shaped supporting and clamping surfaces 3a and 3, respectively.

Both the supporting surface 3a and the clamping surface 3 are designed to feature elements—e.g., elevations 4 preferably made with a generally roof-shaped cross-section, perpendicular to the longitudinal axis of the cutting insert 2. The elevations 4 are preferably formed with an acute angle between 60° and 90°. The elevations 4 are preferably made sharp-edged with an acute angle of 90° and feature a height of about 0.08 mm starting from the supporting and clamping surfaces 3a and 3, respectively.

Figure 5:
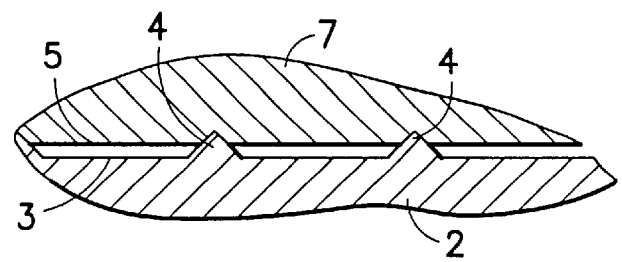
FIG. 5 is an enlarged sectional detail of the side view of the contact surfaces between the toolholder and the cutting insert of the cutoff tool illustrated in FIG. 1.

In order to clamp the cutting insert 2 in the toolholder 1, the cutting insert 2 is inserted within the recess until it abuts the stop. By threading the set screw 8 within the toolholder 1, the clamping claw 7 presses upon the clamping surface 3 of the cutting insert 2, and therefore forces the supporting surface 3a against the contact surface 5 of the supporting segment 6. As is shown in detail in FIG. 5, for the contact surface 5 of the clamping claw 7 and the clamping surface 3 of the cutting insert 2, the clamping force presses the elevations 4 of the cutting insert 2 into the contact surfaces 5 of the clamping claw 7 and the supporting segment 6, respectively, and deforms these contact surfaces 5 in a plastic manner. In this fashion, visibly formed V-shaped grooves are produced in the contact surfaces 5, which are sufficiently deep to stabilize the cutting insert 2 against lateral forces as well as tensile forces from the recess, but are shallow enough to permit the cutting insert 2 to be readily removed from the recess after the clamping screw 8 has been released. Attention should be paid to ensure that, when the cutting insert 2 is clamped fast for the first time, it is pushed in or inserted until it abuts the stop and therefore is correctly positioned to press in and form the notches in the contact surfaces 5 at the right locations. When the cutting insert 2 is replaced, a new cutting insert 2 may be automatically positioned in the correct location by the notches previously formed in the contact surfaces 5.

Figure 2:
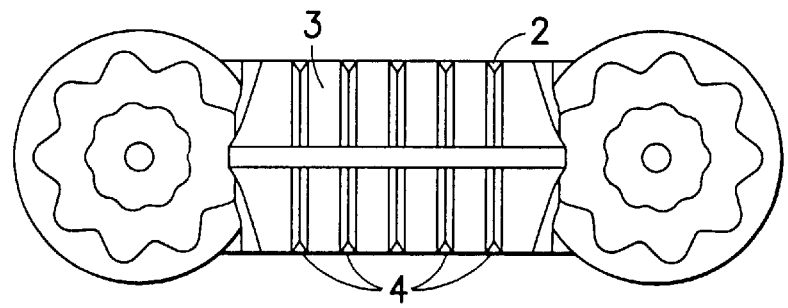
FIG. 2 is a top plan view of the cutting insert for the cutoff tool illustrated in FIG. 1.
Figure 3:
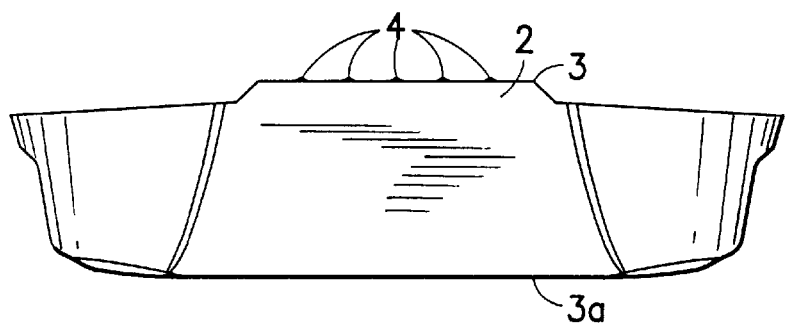
FIG. 3 is a side elevational view of the cutting insert illustrated in FIG. 2.
Figure 4:
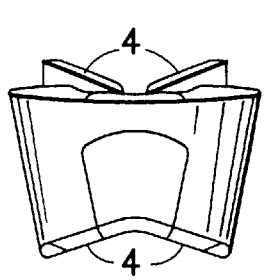
FIG. 4 is a front elevational view of the cutting insert illustrated in FIGS. 2 and 3.

In an experiment to determine the amount of force necessary to pull the indexable, replaceable tool bit or cutting insert out of the toolholder, two identical cutoff tools—one provided with cutting inserts in accordance with the present invention having roof-shaped elevations as illustrated in FIGS. 2–3, and the other provided with cutting inserts having smooth clamping and supporting surfaces—were compared on a tensile testing installation.

The individual indexable, replaceable tool bits or cutting inserts were clamped fast within each tool holder by tightening the clamping screw with a tightening torque of 8 Nm. The toolholders were clamped fast and the respective cutting inserts were pulled out of the toolholder with a pull-out velocity of 1 mm/min. In the case of the cutting tool according to the invention, the forces to pull out the cutting inserts from the toolholder averaged about 1350 N. In contrast, with respect to the cutting inserts without roof-shaped elevations, the measured pull-out forces averaged about 700 N. In other words, the pull-out forces were increased to a value almost twice as large by use of the roof-shaped elevations according to the present invention.

Although an illustrative preferred embodiment has been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A cutting tool comprising a toolholder having a recess for receiving a cutting insert, the cutting insert being releasably retained within the recess such that a second contact surface of the cutting insert is in contacting engagement with a first initially planar contact surface of the toolholder, the cutting insert is extended in length especially for grooving or parting and has at least one element formed on the second contact surface thereof for providing a formfitting, correctly located positioning of the cutting insert within the recess of the toolholder, wherein the at least one element is an extended in length, sharp-edged roof-shaped elevation which is arranged approximately perpendicular to a longitudinal axis of the cutting insert, so that the surface pressure exerted by retaining the cutting insert within the recess of the toolholder produces a plastic deformation of the first initially planar contact surface of the toolholder.

2. The cutting tool according to claim 1, wherein the at least one element comprises a sharp-edged, roof-shaped elevation having an acute angle between 60° and 90°.

3. The cutting tool according to claim 1, wherein the cutting insert is a cutoff parting insert and the second contact surface of the cutting insert is of a generally V-shaped configuration.

4. The cutting tool according to claim 1, wherein a plurality of elevations are formed on the second contact surface of the cutting insert, the elevations being arranged in parallel to one another and perpendicular to a longitudinal axis of the cutting insert.

5. A cutting insert adapted for use in a cutting tool of the type comprising a toolholder having a recess for receiving and releasably retaining the cutting insert, the cutting insert comprising:

- a second contact surface adapted to be in contacting engagement with a first initially planar contacting surface of the toolholder when the cutting insert is received within the recess, the cutting insert being extended in length especially for grooving or parting; and
- at least one element formed on the second contact surface of the cutting insert, the at least one element being adapted to provide a formfitting, correctly located positioning of the cutting insert within the recess of the toolholder, wherein the at least one element is an extended in length, sharp-edged roof-shaped elevation which is arranged approximately perpendicular to a longitudinal axis of the cutting insert, so that the surface pressure exerted by retaining the cutting insert within the recess of the toolholder produces a plastic deformation of the first initially plane contact surface of the toolholder.

6. The cutting insert according to claim 5, wherein the at least one element comprises a sharp-edged, roof-shaped elevation having an acute angle between 60° and 90°.

7. The cutting insert according to claim 5, wherein the cutting insert is a cutoff parting insert and the second contact surface of the cutting insert is of a generally V-shaped configuration.

8. The cutting insert according to claim 5, wherein a plurality of elevations are formed on the second contact surface of the cutting insert, the elevations being arranged in parallel to one another and perpendicular to a longitudinal axis of the cutting insert.

* * * * *